Patented Nov. 28, 1939

2,181,651

UNITED STATES PATENT OFFICE 2,181,651

ZINC SULPHIDE PIGMENT AND METHOD OF IMPROVING THE LIGHT STABILITY OF SAME

John Henry Calbeck, Joplin, Mo., assignor to American Zinc, Lead & Smelting Company, St. Louis, Mo., a corporation of Maine No Drawing. Application January 12, 1938, Serial No. 184,704

9 Claims. (Cl. 23—135)

This invention relates to an improved zinc sulphide pigment and process of making the same.

Zinc sulphide pigment is liable to be light sensitive, that is, to change color under the influence of light, and many efforts have been made to overcome this defect in such pigment. By zinc sulphide pigment, as here used, is meant not only zinc sulphide as such, but also lithopone and other composite pigments containing a substantial percentage of zinc sulphide. When zinc sulphide pigments heretofore known are incorporated with linseed oil or other vehicles to form paints, these paints are frequently darkened or discolored by exposure to sunlight or the combination of moisture and sunlight. It is also well known that the presence of chlorides in pigment, prior to calcining, results in a calcined pigment that is light sensitive.

The causes of light sensitivity of zinc sulphide pigments appear to be of two kinds; one is due to physical conditions and becomes apparent when such pigments are mixed with oil vehicles; the other is due to chemical conditions and appears when such pigments are mixed in glycerol. Various rapid methods are employed to test light stability of the pigment. One common method is to prepare a paste of the pigment and linseed oil, rub out a thin layer of the paste on a glass plate, immerse the plate in water so that a very thin layer of water covers the paste, and then expose the immersed plate to a powerful ultra-violet light for a period of time and observe what discoloration, if any, results. Another method is to prepare a paste of the pigment and glycerol and expose this paste to the ultra-violet light. These two methods will not always give comparable results. Often a pigment that is relatively light stable in linseed oil proves to be very light sensitive in glycerol. It is very desirable to have a zinc sulphide pigment that will prove light stable under both of these laboratory tests, since it gives better assurance of satisfactory performance of the pigment when exposed to sunlight in use. It is especially desirable that zinc sulphide pigment shall be light stable under glycerol-ultra-violet test.

I have discovered that light instability in glycerol of zinc sulphide pigments is frequently due to the presence of certain strong reducing sulphur or oxy-sulphur compounds, such as sulphites, which frequently have a deleterious effect on the finished pigment. For example, when zinc sulphide pigments containing objectionable sulphur compounds are incorporated in paint, the applied paint film has certain objectionable characteristics, such as discoloration in sunlight, staining by nails, screens and other metal objects and also exhibits decidedly inferior durability. Furthermore, when zinc sulphide pigments containing these objectionable sulphur compounds are incorporated in rubber, the rubber is frequently discolored to an objectionable extent when exposed to sunlight.

Some of the injurious reducing sulphur compounds if soluble in water when present in the oxy-sulphur compound-zinc sulphide-water system may be removed from the precipitated zinc sulphide particles by simply washing in water, but others appear to be insoluble when in such system and cannot be removed by simple washing. The exact formula for many of these injurious compounds is not known, but we do know that it is impossible to wash them out with water alone. I have discovered, however, that after treatment as herein described they can be washed out with water. According to the present invention, I first wash crude zinc sulphide precipitate in water to remove any reducing sulphur compounds that are water soluble when in the zinc sulphide-oxy-sulphur compounds-water system. I then treat the remaining sulphur compounds which are not removable by simple washing with a base, such as calcium oxide, magnesium oxide or other base, and then wash them out, together with the base. After the sulphur compounds and base have been washed out I then treat and calcine the washed pigment under non-oxidizing conditions in the usual manner and without quenching. This gives a zinc sulphide pigment that severe tests show is highly light stable in glycerol and far superior to pigments that are calcined without the removal of the reducing sulphur compounds.

In testing pigment for light stability in glycerol, I proceed as follows:

A thick paste is prepared using water-white glycerol and a zinc pigment. A thick smear of this paste is placed on a porcelain plate and one-half of the smear is covered with a sheet of zinc metal and the plate placed fourteen inches from a horizontal laboratory Uviarc outfit (DC-6H4DI) and exposed for fifteen minutes to the light. If the pigment is light proof, the exposed area of the smear will retain the exact color and shade of the unexposed area. Ordinarily when the term "light proof" is used, one means that discoloration is very slight or negligible. I use the term here to mean absolutely no discoloration. There should be no discoloration even after long periods of exposure, such as one hour, but as a test method, fifteen minutes is used because this is more than sufficient.

In my U. S. Patent No. 2,006,259 there is disclosed a process wherein zinc sulphide crystals of substantially uniform size and shape are precipitated by reacting zinc sulphate with a thiosulphate. A base is added to the reacting boiling solution at a rate that maintains a potential of approximately 700 mv. between electrodes of zinc and antimony immersed in the solution. When the reaction is complete, i. e., when practically all of the zinc has been precipitated as zinc sulphide, the precipitate is washed on a filter until practically free of water soluble salts. The zinc sulphide produced by this method is substantially free from chlorine, and the following example of the present invention is given to illustrate the invention in detail when employed in connection with the manufacture of zinc sulphide by the method described in said patent. The washed zinc sulphide filter cake obtained by the process of said patent, in a case for example when the thiosulphate used is ammonium thiosulphate and the base used is ammonia, is repulped in approximately four volumes of water and allowed to settle and the supernatant liquor is decanted. The decanted water normally has less than 5 grams per liter ammonium sulphate, but contains some thiosulphate or similar sulphur compounds as shown by the fact that the filtrate reduces iodine solution. To this slurry of washed zinc sulphide is added milk of lime—approximately 25 pounds hydrated lime for each ton of zinc sulphide contained in the slurry. The milk of lime is thoroughly mixed into the washed zinc sulphide slurry by agitating with compressed air for about two hours. The slurry is then filtered and the cake washed on a filter with clear water. The filtrate will be rich in the iodine-reducing compounds and will frequently require as much as 15 cc. N/10 iodine per 100 cc. filtrate. The cake is washed with water on the filter until the filtrate requires less than 3 cc. N/10 per 100 cc. filtrate and is then removed from the filter and dried in the usual manner. After drying it is calcined with approximately 2% of its weight of brimstone in an air tight calcining furnace at a temperature of approximately 700° C., provided with an air-free cooling chamber, so that the calcine can be removed without quenching, as is fully described in said Patent No. 2,006,259. The calcine is as easily broken up as the dry filter cake and requires only the disintegrating obtained by a simple pulverizer to make it ready for use. This product shows absolutely no darkening in glycerol under the ultra-violet lamp. Furthermore, there is very little calcium sulphate or other compound of calcium in the product. The addition of 25 pounds Ca(OH)$_2$ to 2,000 pounds of zinc sulphide would give more than 2% CaSO$_4$, if it all remained in the pigment, but the zinc sulphide content of the pigment averages over 99% and the total water soluble averages under 0.35%, clearly indicating that the larger part of the lime compounds have been washed out.

While in the above example, the base employed is milk of lime, I have discovered that other bases may be used. For example, I have used MgO—CaO—Ba(OH)$_2$—Na$_2$CO$_3$—
NaHCO$_3$—NaOH and NH$_4$OH or mixtures thereof such as MgO and CaO, and found them effective in that by their use the glycerol-light stability of the product may be secured, but I prefer to employ CaO or MgO or a mixture thereof as a base. With barium hydroxide, the zinc sulphide content of the pigment is reduced because of the formation of barium sulphate which does not wash out. The sodium carbonates are effective but are more expensive than lime. Sodium hydroxide is not only expensive but must be diluted so much before using that it makes an objectionable volume to filter. Ammonium hydroxide is also expensive and requires larger amounts than the stronger bases.

I am aware of the fact that bases such as those above mentioned have been used to modify the alkalinity and light stability of zinc sulphide pigments by simply adding the same to the pigment. For example: Magnesia has been added to crude lithopone as well as to the finished product to improve light stability, but this has certain disadvantages, such as livering when ground in oil, because the magnesia or the reaction products remain in the finished product. By the present invention only enough base (determined by analysis) is added to the sulphide pigment to render the injurious reducing sulphur compounds removable by washing with water, and the whole is then thoroughly washed in water thus removing the injurious compounds and most of the base, only enough of the base remaining to carry on through the drying and calcining steps and avoid excess alkalinity in the finished product. The finished product will have none of the base therein and will be absolutely stable to light. The base, having combined with or otherwise effected the deleterious substances, is washed out with them. In zinc sulphide precipitated by thiosulphate and treated as described above, a neutral or very slightly basic pigment usually results, but by taking care to add only enough base (determined by analysis) to remove the objectionable sulphur compounds and then taking care to thoroughly wash the pigment, a pigment that is very slightly acid in character may be secured. For certain purposes it is desirable to avoid all alkalinity in a pigment. For example, alkaline pigments are undesirable in rubber when certain accelerators such as mercaptobenzothiazole are used, because among other things they cause scorching. By the present invention a pigment may be obtained that will be light stable in glycerol and will not be alkaline.

It is my opinion that the chemistry involved in this invention is as follows: When zinc sulphide pigments are precipitated, certain zinc-sulphur and zinc oxy-sulphur compounds are produced in very small amounts along with the zinc sulphide. Zinc thiosulphate is a compound of this type and can be taken as an example. The zinc thiosulphate, as such, cannot be washed out by water; it is probably adsorbed on the surface of the freshly precipitated zinc sulphide and therefore it is practically impossible to wash it out by water alone. But if calcium or magnesium hydroxide or certain other bases are added, the zinc thiosulphate is converted into zinc hydroxide and calcium thiosulphate according to the following equation:

$$ZnS_2O_3 + Ca(OH)_2 \rightarrow Zn(OH)_2 + CaS_2O_3$$

These thiosulphates are salts extremely soluble in water and in addition to this, they improve the solubility of any calcium sulphate that may be present and both the thiosulphates and the calcium sulphate are readily washed out of the pigment with water.

It is my observation that unless the objectionable reducing sulphur compounds are removed from the zinc sulphide prior to calcining, there can be no assurance that they will be completely decomposed in calcining and that the product will not be light stable when exposed to ultra-violet light with glycerol. On the other hand, by treating zinc sulphide precipitate with a suitable base, as herein described, a product can be assured that is light stable in glycerol even when furnace temperatures are allowed to vary and other conditions are unfavorable.

Having thus described the invention, what is claimed is:

1. The process of treating precipitated zinc sulphide pigment which consists in washing the precipitate with water, whereby some of the impurities are removed, then treating the precipitate and the remaining impurities with a base, then washing reaction products from the precipitate with water, and then calcining the washed precipitate.

2. The process of treating precipitated zinc sulphide pigment which consists in washing the precipitate with water, whereby some of the impurities are removed, then treating the precipitate and the remaining impurities with calcium oxide, then washing reaction products from the precipitate with water, and then calcining the washed precipitate.

3. The process of treating precipitated zinc sulphide pigment which consists in washing the precipitate with water, whereby some of the impurities are removed, then treating the precipitate and the remaining impurities with magnesium oxide, then washing reaction products from the precipitate with water, and then calcining the washed precipitate.

4. The method of preparing a zinc sulphide pigment that is light stable in glycerol, which consists in washing the pigment in water, then subjecting the reducing compounds remaining on the pigment to the action of a base, and then washing out reaction products, and the base, and then calcining the washed precipitate.

5. In a method of preparing a zinc sulphide pigment that is light stable in glycerol, the steps of treating the crude pigment and contained impurities with a base and then washing out the soluble reaction compounds with water until 100 cc. of the decanted or filtered wash water consumes not more than 3 cc. N/10 iodine solution, and then drying and calcining the pigment.

6. In a method of preparing a zinc sulphide pigment that is light stable in glycerol, the steps of treating the crude pigment and contained impurities with a base and then washing out the soluble oxy-sulphur compounds with water until 100 cc. of the decanted or filtered wash water consumes not more than 3 cc. N/10 iodine solution, and then drying and calcining the pigment.

7. In a process of treating precipitated zinc sulphide pigment, the steps of washing the precipitate with water, then treating the washed precipitate with a base, then washing the base-treated precipitate with water, and then calcining the precipitate.

8. In a process of treating precipitated zinc sulphide pigment, the steps of washing the precipitate with water, then treating the washed precipitate with calcium oxide, then washing the base-treated precipitate with water, and then calcining the precipitate.

9. In a process of treating precipitated zinc sulphide pigment, the steps of washing the precipitate with water, then treating the washed precipitate with magnesium hydroxide, then washing the base-treated precipitate with water, and then calcining the precipitate.

JOHN HENRY CALBECK.